(12) United States Patent
Skolicki

(10) Patent No.: US 9,875,307 B2
(45) Date of Patent: *Jan. 23, 2018

(54) USING CONTENT IDENTIFICATION AS CONTEXT FOR SEARCH

(71) Applicant: Google Inc., Mountain View, CA (US)

(72) Inventor: Zbigniew Skolicki, Cracow (PL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,587

(22) Filed: Jan. 22, 2016

(65) Prior Publication Data

US 2016/0140247 A1    May 19, 2016

Related U.S. Application Data

(63) Continuation of application No. 13/731,656, filed on Dec. 31, 2012, now Pat. No. 9,244,977.

(51) Int. Cl.
*G06F 17/30*  (2006.01)
*H04N 21/462*  (2011.01)
(Continued)

(52) U.S. Cl.
CPC .. *G06F 17/30867* (2013.01); *G06F 17/30442* (2013.01); *G06F 17/30528* (2013.01);
(Continued)

(58) Field of Classification Search
CPC ........ G06C 17/30528; G06C 17/30554; H04N 21/8352; H04N 21/4828; H04N 21/4622;
(Continued)

(56) References Cited

U.S. PATENT DOCUMENTS 6,006,225 A * 12/1999 Bowman ........... G06F 17/30395
707/999.004
6,564,213 B1 * 5/2003 Ortega ................ G06F 17/3064
707/999.003
(Continued)

OTHER PUBLICATIONS

Eaton, K., "The Click Clique: Apple, Microsoft, and Others Don't Care About Your New TV Remote", pp. 1-10, available at: http://www.fastcompany.com/1800669/click-clique-apple-microsoft-and-others-dont-care-about-your-new-tv-remote-, last acccessed Jan. 8, 2013.

(Continued)

*Primary Examiner* — Kris Mackes
*Assistant Examiner* — Tiffany Bui
(74) *Attorney, Agent, or Firm* — Byrne Poh LLP

(57) ABSTRACT

Techniques for using contextual information relating to content presented by a television as part of a search query for an information search are presented. A search management component, at a given moment in time during presentation of television-related content by a communication device in or associated with a television, identifies contextual information associated with a section of the television-related content and generates a content identifier timestamp associated with the contextual information and the section of television-related content. A search component augments a search query using the contextual information to facilitate customization of a subset of search results based on the contextual information. The contextual information in the search query can facilitate disambiguating the search query or promoting a search result over another search result in the subset of search results, based on the contextual information, to facilitate customization of the subset of search results.

18 Claims, 9 Drawing Sheets

(51) Int. Cl.
*H04N 21/482* (2011.01)
*H04N 21/8352* (2011.01)

(52) U.S. Cl.
CPC .. *G06F 17/30554* (2013.01); *G06F 17/30796* (2013.01); *H04N 21/4622* (2013.01); *H04N 21/4828* (2013.01); *H04N 21/8352* (2013.01)

(58) Field of Classification Search
CPC ......... G06F 17/30442; G06F 17/30796; G06F 17/30867; G06F 17/30528; G06F 17/30554
USPC .......................................................... 707/765
See application file for complete search history.

(56) References Cited

U.S. PATENT DOCUMENTS

| | | | |
|---|---|---|---|
| 7,162,473 B2 | 1/2007 | Dumais et al. | |
| 7,548,910 B1* | 6/2009 | Chu ................. | G06F 17/30616 |
| 7,603,349 B1* | 10/2009 | Kraft ................. | G06F 17/30867 |
| 7,849,080 B2* | 12/2010 | Chang ................ | G06Q 30/02 |
| | | | 707/706 |
| 8,176,068 B2 | 5/2012 | Kunjithapatham et al. | |
| 8,478,779 B2 | 7/2013 | Bergstraesser et al. | |
| 2007/0061331 A1* | 3/2007 | Ramer ............... | G06F 17/30867 |
| | | | 707/999.01 |
| 2007/0214488 A1 | 9/2007 | Nguyen et al. | |
| 2007/0266002 A1* | 11/2007 | Chowdhury ...... | G06F 17/30648 |
| | | | 707/999.002 |
| 2008/0109401 A1* | 5/2008 | Sareen ............... | G06F 17/30864 |
| | | | 707/999.003 |
| 2008/0183698 A1 | 7/2008 | Messer et al. | |
| 2008/0208825 A1* | 8/2008 | Curtis ................. | G06F 7/00 |
| | | | 707/999.003 |
| 2008/0226119 A1 | 9/2008 | Candelore et al. | |
| 2009/0063461 A1* | 3/2009 | Wang ................. | G06F 17/30672 |
| | | | 707/999.005 |
| 2009/0112848 A1 | 4/2009 | Kunjithapatham et al. | |
| 2009/0240683 A1* | 9/2009 | Lazier ............... | G06F 17/30864 |
| | | | 707/999.005 |
| 2009/0247197 A1 | 10/2009 | Graff et al. | |
| 2009/0327236 A1* | 12/2009 | Denney ............... | G06F 17/3064 |
| | | | 707/999.003 |
| 2012/0254234 A1 | 10/2012 | LaJoie et al. | |
| 2012/0324076 A1 | 12/2012 | Zerr et al. | |
| 2013/0332838 A1 | 12/2013 | Naggar et al. | |
| 2014/0089953 A1 | 3/2014 | Chen et al. | |
| 2014/0130092 A1 | 5/2014 | Kunisetty | |

OTHER PUBLICATIONS

Good, R., "Search Video and TV Content by Keywords Spoken in the Content", pp. 1-8, available at: http://www.masternewmedia.org/video_search/video_indexing/search_video_recordings_by_keywords_20050802.htm, last accessed Jan. 25, 2013.
International Patent Application No. PCT/US2013/072046, filed Nov. 26, 2013.
International Preliminary Report on Patentability dated Jun. 30, 2015 in International Patent Application PCT/US2013/072046.
International Search Report dated Mar. 31, 2014 in International Patent Application No. PCT/US2013/072046.
Messer, A., et al., "SeeNSearch: A Context Directed Search Facilitator for Home Entertainment Devices", In Proceedings of the Sixth Annual IEEE International Conference on Pervasive Computing and Communications, Hong Kong, CN, Mar. 17-Mar. 21, 2008, pp. 20-29.
Office Action dated Apr. 3, 2015 in U.S. Appl. No. 13/731,656.
Office Action dated Nov. 19, 2014 in U.S. Appl. No. 13/731,656.
World Wide Web Consortium, "Semantic-based Framework for Personalized TV Content Management in a cross-media environment: A Personalized Program Guide on the Web, TV and Mobile", pp. 1-7, available at: http://www.w3.org/2006/07/SWD/wiki/EucPersonalizedTvDetailed.html, last accessed Jan. 8, 2013.
Written Opinion dated Mar. 31, 2014 in International Patent Application No. PCT/US2013/072046.

* cited by examiner

USING CONTENT IDENTIFICATION AS CONTEXT FOR SEARCH

CROSS-REFERENCE TO RELATED APPLICATION

This application is a continuation of U.S. patent application Ser. No. 13/731,656, filed Dec. 31, 2012, now U.S. Pat. No. 9,244,977, which is hereby incorporated by reference herein in its entirety.

TECHNICAL FIELD

This disclosure relates generally to information searching, and more specifically to using content identification as context for a search.

BACKGROUND

Communication devices, such as, for example, computers, mobile phones, electronic tablets, televisions or devices associated with televisions, can be used to perform online searches (e.g., Internet searches) or local searches (e.g., search for information associated with a local network, search of information on a communication device, etc.) to obtain search results responsive to a search. Using a communication device, a user can submit a search query to a search engine that can search an information network(s) (e.g., the Internet, intranet, etc.) and can obtain search results based on the search query. Various types of communication devices can have the capability of generating search queries and communicating the search queries to a search engine to facilitate obtaining search results responsive to the search queries. Such communication devices can include, for example, a television, an IP television (IPTV), a set-top box, a computer, a content-streaming device, a mobile phone, an electronic tablet, an electronic pad, electronic notebook, an electronic reader, an electronic gaming device, a personal digital assistant (PDA), or an electronic device comprising information communication functionality.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems, methods, and techniques disclosed herein relate to identifying and using contextual information in a section of content being presented by a communication device to facilitate generating search results that can be customized based at least in part on the contextual information. Disclosed herein is a system that can include a search management component that identifies, at a moment in time, television-related content within a sequence of television-related content presented by a communication device that includes or is associated with a television-related communication device, and identifies contextual information in or associated with the television-related content. The system also can include a search component that augments a search query using the contextual information to facilitate customization of a subset of search results based at least in part on the contextual information.

Also disclosed herein is a method that includes employing at least one processor to facilitate execution of code instructions retained in at least one memory device. The at least one processor, in response to execution of the code instructions, performs operations comprising: identifying, at a given moment in time, contextual information in or associated with television-related content presented by a communication device that includes or is associated with a television-related communication device; and transmitting a search query comprising the contextual information to facilitate customizing a subset of search results based at least in part on the contextual information.

Also disclosed herein is a system that can include a server component that stores a set of items of information. The system also can include a search engine that searches the set of items of information in the server component to generate a subset of search results customized based at least in part on a search query comprising contextual information in or associated with a section of television-related content identified at a given moment of time within a television-presented program comprising the section of television-related content.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
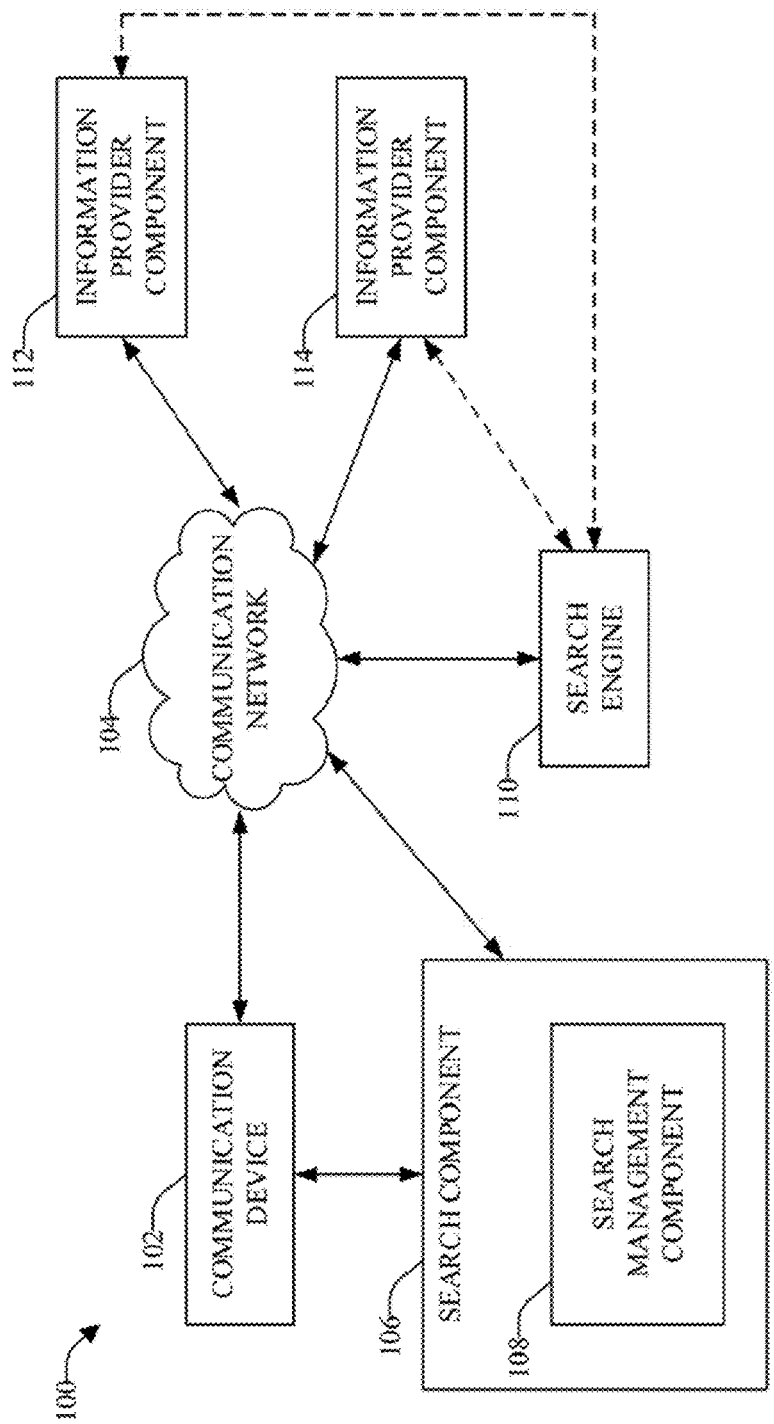
FIG. 1 illustrates a block diagram of an example system that can use contextual information relating to content presented by a communication device as part of a search query for an information search in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Communication devices, such as, for example, computers, mobile phones, electronic tablets, televisions or devices associated with televisions, can be used to perform online searches (e.g., Internet searches) or local searches (e.g., search for information associated with a local network, search of information on a communication device, etc.) to obtain search results responsive to a search. Using a communication device, a user can submit a search query to a search engine that can search an information network(s) (e.g., the Internet, intranet, etc.) and can obtain search results based on the search query. It can be desirable to tailor a search query to obtain a more tailored, refined, and/or relevant set of search results.

To that end, techniques for using contextual information relating to content presented by a television as part of a search query for an information search are presented. A communication device, or a second communication device associated with the communication device, can include a search component, which can include or be associated with a search management component. The search component can generate and provide a search query to a search engine to facilitate obtaining search results responsive to the search query.

At a given moment in time during presentation of television-related content by a communication device in or associated with a television, the search management component can identify contextual information associated with a section of the television-related content and can generate a content identifier timestamp that can include or be associated with the contextual information and the section of television-related content. The search management component can store the content identifier timestamp and/or use all or a portion of the information (e.g., contextual information) in the content identifier timestamp available to facilitate enhancing (e.g., augmenting) a search query (e.g., a search query being generated at or near the time of the content identifier timestamp or at a more distant time in the future). The search component can augment a search query using the contextual information (e.g., as contained in the content identifier timestamp) to facilitate customization of a subset of search results based at least in part on the contextual information, in accordance with defined search criteria. The search component can provide the augmented search query to the search engine.

The search engine can generate a subset of search results that can be customized based at least in part on the contextual information. For example, the search engine can use the contextual information in the search query to facilitate identification of one or more relevant search results, disambiguation of the search query, or promotion of a search result over another search result in the subset of search results, based at least in part on the contextual information (e.g., as contained in a content identifier timestamp), to facilitate the customization of the subset of search results. The search engine can provide the subset of search results (e.g., subset of customized search results) to the search component, which can provide (e.g., present) the subset of search results to a user via the communication device or the second communication device.

In some implementations, the search component can integrate online information access (e.g., Internet access) with the presentation of video or audio content on a communication device (e.g., television, Internet protocol television (IPTV), set-top box, computer, content-streaming devices, etc.). The search component can obtain (e.g., receive, detect, etc.), from the communication device, information relating to content being presented by the communication device to a user. For example, the communication device can include or be associated with a set-top box and/or an integrated tuner that can provide information relating to the content being presented by the communication device to the search component. The search management component can analyze such information to facilitate generating respective items of contextual information in relation to respective sections of content of respective entities (e.g., TV show, movie, song, electronic game, etc.)

The search management component can analyze the content being presented by the communication device to recognize and/or identify information (e.g., objects, such as products, people, etc.; program scene; dialogue; program or scene subject matter; metadata; etc.) in or associated with the presented content and the particular moment in time (e.g., moment in time in relation to the overall presentation time of the entity (e.g., program, show, movie, song, video, etc.) that includes the content, or current local time). For example, the search management component can use a pattern recognition technique(s) to recognize and/or identify visual objects or visual information in or associated with the presented content, and/or can use a voice recognition technique(s) to recognize and/or identify audio objects or audio information in or associated with the presented content. By identifying the information in the content presented by the communication device to the user and the moment in time associated with the identified information, the search management component can correlate user activity during presentation of the content to the user with the particular moment in time the content is being presented to the user by the communication device. For instance, the search management component can generate a content identifier timestamp that can include the information (e.g., contextual information) identified in the presented section of content, the moment in time associated with the identified information, and/or other information relating to the information identified in the presented section of content.

In accordance with various implementations, a search management component can utilize other information (e.g., other contextual information), such as information indicating the geographical location of a communication device (e.g., first communication device and/or the second communication device), information (e.g., user interests, prior searches of user, etc.) in a user profile, etc., as additional or alternative context for a search query to facilitate customizing search results responsive to the search query. The search management component also can track historical content viewing history and/or search history (e.g., search query history, search result viewing history, etc.) associated with a user, and can store the historical content viewing history and/or the search history to build a user profile for the user. The search management component can use all or a portion of the historical content viewing history and/or search history associated with the user as additional contextual information (e.g., in addition to the contextual information associated with a section of the television-related content currently being perceived by the user) that can be included in a search query being made by a user to facilitate customizing search results responsive to the search query.

To facilitate improving search relevance and/or search results responsive to a search query, the search management component can utilize a filter component (e.g., including one or more filters of one or more types) on the viewing history of a user, for example, to only consider entities (e.g., programs, shows, movies, songs, videos, electronic games, etc.) viewed or perceived (e.g., listened to) over a defined recent time period (e.g., within the last 24 hours, within the last week, with the last month, etc.) in identifying or generating the additional contextual information relating to the viewing history of the user. The search management component also can utilize the filter component on the search history of the user, for example, to only consider search entities (e.g., search queries, search results, etc.) associated with the user over a defined recent time period in identifying or generating the additional contextual information relating to the search history of the user.

The search management component can use the additional contextual information (e.g., derived from user's historical content viewing history, user's search history, location of user's communication device, other information in the user profile, etc.), for example, to facilitate identifying or obtaining additional search results at least potentially relevant to the search query and/or can modify ranking of search results obtained in response to the search query, based at least in part on the additional contextual information, to customize the results to the search query. The search management component can present the customized results to the search query via a communication device (e.g., television, communication device associated with (e.g., communicatively connected to) a television, mobile phone, electronic pad or tablet, etc.) associated with the user.

The search management component also can span the correlation between the contextual information associated with a section of content (e.g., as contained in the content identifier timestamp) and user activity of the user perceiving, or at least potentially perceiving, the content across more than one communication device. For instance, the search management component can generate contextual information (e.g., as contained in or associated with a content identifier timestamp) in relation to content being presented by a communication device (e.g., television), and the contextual information can be included in a search query generated by a second communication device (e.g., mobile phone, electronic tablet, electronic glasses, etc.) that is paired with or in proximity to the communication device.

In some implementations, the communication device can be paired directly with the second communication device, for example, in accordance with a defined device pairing protocol and/or by having the communication device and the second communication device log in (e.g., sign in) to a same account (e.g., using the same username and authentication credentials). A first search component and first search management component can be associated with the communication device. At a given moment in time, the first search management component can identify contextual information relating to a section of content (e.g., of an entity, such as a program, movie, song, etc.) being presented by the communication device and can generate a content identifier timestamp that can include the contextual information. The first search management component can provide (e.g., transmit) the content identifier timestamp to the second communication device. The second communication device can include a second search component and second search management component. The second search component can generate a search query that can be augmented or modified to include all or a portion of the contextual information associated with the content identifier timestamp, in accordance with the defined search criteria. The second search component can provide (e.g., transmit) the search query (e.g., augmented search query) to a search engine. The search engine can process the search query and, in response to the search query, can generate a subset of search results (e.g., a subset of customized search results) that can be customized based at least in part on the contextual information in the search query. The search engine can provide the subset of search results to the second communication device for presentation to the user of the second communication device.

In certain other implementations, the communication device can be indirectly paired with the second communication device, for example, when the second communication device is in proximity to (e.g., is within a defined distance from) the communication device. At a given moment in time, the second search management component of the second communication device can identify contextual information relating to a section of content (e.g., of an entity, such as a program, movie, song, etc.) being presented by the communication device and can generate a content identifier timestamp that includes the contextual information. For example, the second communication device can perceive content being presented by the communication device, and the second search management component can analyze the content to identify contextual information in a section of content at a given moment in time. The second search component can generate a search query that can be augmented or modified to include all or a portion of the contextual information associated with the content identifier timestamp, in accordance with the defined search criteria. The second search component can provide (e.g., transmit) the search query (e.g., augmented search query) to a search engine. The search engine can process the search query and, in response to the search query, can generate a subset of search results (e.g., a subset of customized search results) that can be customized based at least in part on the contextual information in the search query. The search engine can provide the subset of search results to the second communication device for presentation to the user of the second communication device.

Referring now to the drawings, FIG. 1 illustrates a block diagram of an example system 100 that can use contextual information relating to content presented by a communication device (e.g., television and/or a television-related device) as part of a search query for an information search in accordance with various aspects and implementations described herein. The system 100 can include a communication device 102 that can receive or transmit information (e.g., video content, audio content, textual information or messages, etc.). The communication device 102 can be or can include, for example, a television, an IPTV, a set-top box, a computer, a content-streaming device, a mobile phone, an electronic tablet, an electronic pad, electronic notebook, an electronic reader, an electronic gaming device, a personal digital assistant (PDA), an electronic device (e.g., electronic eyewear or bodywear) comprising information communication functionality, etc.

The communication device 102 can be associated with (e.g., communicatively connected to) a communication network 104 that can facilitate communication (e.g., receiving, transmitting) of information between the communication device 102 and other communication devices associated with the communication network 104. The communication network 104 can include an Internet protocol (IP)-based network and/or a core network (e.g., mobile core network) that can facilitate wireline or wireless communication of information between the communication device 102 and other communication devices associated with the communication network 104.

The communication device 102 can be associated with (e.g., communicatively connected to), or can include, a search component 106 that can include or be associated with a search management component 108. The search component 106 and search management component 108 can be associated with (e.g., communicatively connected to) the communication network 104. The search component 106 can generate and provide (e.g., transmit) a search query to a search engine 110 to facilitate obtaining search results responsive to the search query. In accordance with various implementations, the search engine 110 can be separate from the search component 106 (as depicted in FIG. 1) or can be part of the search component 106. The search engine 110 can be associated with (e.g., communicatively connected to) the communication network 104 to facilitate communication of information between the search engine 110 and other communication devices (e.g., communication device 102, search component 106, server(s) that can store and provide information, etc.).

The search engine 110 can be associated with (e.g., communicatively connected to) one or more information provider components (e.g., information servers and/or other communication devices that can store and provide information, such as textual information, video content, audio content, etc.), such as information provider component 112 and information provider component 114. In some implementations, the search engine 110 can be associated with the one or more information provider components via the communication network 104. In other implementations, the search engine 110 can be communicatively connected to one or more of the information provider components (e.g., information provider component 112, information provider component 114, etc.) via an internal network (e.g. an intranet), or the search engine 110 and the one or more information provider components can be part of another component (not shown in FIG. 1).

A user can be using the communication device 102 to perceive content (e.g., video content, audio content, textual content, etc.). For example, the user can be viewing an entity (e.g., program, show, movie, song, video, electronic game, etc.) on the communication device 102. The entity can be received from the communication network 104 and presented on the communication device 102, can be received from a local communication source or device (e.g., a digital video disc (DVD) played on a DVD player, a compact disc played on a CD or other content player, a video or audio tape played on a video or audio tape player, a game or application utilized on an electronic gaming device, a game or application utilized locally on a communication device (e.g., mobile phone, computer, electronic pad or tablet, PDA, etc.), or can be received from another source and presented on the communication device 102.

At a given moment in time during presentation of content (e.g., television-related content) by the communication device 102 (e.g., presentation of content in or associated with a television), the search management component 108 can identify contextual information associated with a section of the content being presented at or near that given moment, and/or can generate a content identifier timestamp that can include or be associated with the contextual information and the section of content. The section of content can be, for example, a 1-frame snapshot of the content, a multi-frame snapshot of the content, a 1-second segment of content, a 5-second segment of content, a 10-second segment of content, or an amount of content of virtually any desired time length. The search management component 108 can store the contextual information and/or the content identifier timestamp (e.g., in a data store), and/or can make the contextual information and/or content identifier timestamp available to the search component 106 for use as part of (e.g., to augment) a search query (e.g., a search query being generated at or near the time the contextual information or content identifier timestamp was generated or a search query made at a more distant time in the future).

The search component 106 can augment a search query using all or a portion of the contextual information (e.g., as contained in the content identifier timestamp) to facilitate customizing a subset of search results based at least in part on the contextual information. The search management component 108 can analyze the search terms of a search query made by the user using the communication device 102, and based at least in part on the results of the analysis, can identify at least a portion of the contextual information associated with the section of content that can enhance the search query to facilitate providing improved search results as compared to the original search query. The search management component 108 can augment the search query to include at a portion of the contextual information, for example, to generate an augmented search query, based at least in part on the analysis results. The search component 106 can provide the augmented search query to the search engine 110 to facilitate obtaining a subset of search results (e.g., a subset of customized search results) that can be customized based at least in part on the portion of the contextual information.

For instance, based at least in part on the analysis of a section of content being presented by the communication device 102 at a given moment in time, the search management component 108 can identify contextual information in or associated with the section of content. The contextual information can include, for example, the name of the entity, the scene or portion of the entity associated with the section of content, type of entity, type of object in or associated with the section of content, a geographical location(s) or landmark(s) in the scene in the section of content and/or the entity, information relating to the dialogue, lyrics, or textual information in or associated with the section of content or entity, a color type of the entity, the era or year that the content was made in or is set in, and/or other contextual information associated with that section of content. An entity can be, for example, a TV program, a movie, a song, or an electronic game, etc. A type of entity can be, for instance, a drama, a comedy, a musical, science fiction, etc., for a movie or a TV show; rock, country, jazz, rhythm and blues, etc., for a song; etc. A type of object can be a person, a vehicle, a musical instrument, a building, etc. Contextual information relating to a type of object can include other identifying information relating to the object (e.g., an actor, musician, artist, etc.; a character (e.g., a policeman, a teacher, a judge, etc.) portrayed by an actor; the name, sex, and/or physical features of the person; etc.) The information relating to the dialogue, lyrics, or textual information in or associated with the section of content or entity can include, for example, metadata associated with the section of content or entity, a description of the entity or the section of content (e.g., as contained in TV listings or metadata), closed-caption information associated with the section of content, as well as dialogue or lyrics associated with the section of content. The color type of the entity can include a color content, black and white content, hybrid content (e.g., both color content and black and white content. The era or year can include, for example, a time period defined by an event(s) (e.g., Great Depression era, World War I era, World War II era, Vietnam War era, etc.) or a time period define by a date or time period (e.g., Jul. 4, 1776, Dec. 7, 1941, Sep. 11, 2001, etc.; 1984, 1998, 2009, etc.; 1980s, 1990s, 2000s, etc.) The various types of contextual content that can be identified by the search management component 108 can vary based at least in part on the section of content and information associated therewith. The search management component 108 can generate a content identifier timestamp that can include the identified contextual information and time information associated with the section of content. The search management component 108 can store the content identifier timestamp in a data store and/or use the information associated with the content identifier timestamp to facilitate enhancing a search query (queries) communicated by the communication device 102 (or a second communication device associated therewith), in accordance with the defined search criteria.

It is to be appreciated and understood that, while aspects of the disclosed subject matter have described the content identifier timestamp as including contextual information relating to a section of content, in some implementations, the content identifier timestamp associated with a section of content may not include contextual information relating to the section of content. In such implementations, the search management component 108 can generate a content identifier timestamp that can include information (e.g., content identifier) identifying the section of content (e.g., television-related content) being presented by the communication device and time information (e.g., time identifier) that can indicate the moment or period in time the section of content was presented, wherein the content identifier timestamp does not include contextual information relating to the section of content.

In such implementations, the search engine 110 or a server associated with the search engine 110 can include a search component and/or a search management component that can comprise all or a desired portion of the features and functionality of the search component 106 and search management component 108, respectively, as described herein, or the search component 106 and search management component 108 can be distributed among multiple components (e.g., a portion (e.g., sub-components) of the search component 106 and search management component 108 can be distributed among the search engine 110 or an associated server, and another portion(s) of the search component 106 and search management component 108 can be distributed among another component(s) or can be stand-alone). In relation to a search query associated with the communication device 102, the search management component, associated with (e.g., part of or directly connected to) the search engine 110 or the associated server, can analyze the information associated with the content identifier timestamp and can identify, determine, or generate contextual information relating to the section of content associated with the content identifier timestamp, based at least in part on the analysis. The search management component, associated with the search engine 110 or the associated server, can augment the search query, based at least in part on the contextual information, to generate an augmented search query. The search engine 110 can execute the augmented search query to generate a subset of search results that can be customized based at least in part on the contextual information associated with the augmented search query, as more fully disclosed herein.

As an example of augmenting a search query in relation to a section of content, the search management component 108 can augment a search query to include contextual information associated with the section of content to facilitate enhancing and/or more precisely focusing a search query. For instance, the communication device 102 can be presenting the movie "The Enforcer" starring Clint Eastwood to a user. The search management component 108 can analyze a section of content of "The Enforcer" being presented by the communication device 102 at a given moment of time. The section of content can include, for instance, an actor (e.g., Clint Eastwood) as a character ("Dirty Harry", "Harry Callahan") in a scene of a movie (e.g., "The Enforcer") where the actor is at Alcatraz in San Francisco and is holding a gun. Based on the analysis, the search management component 108 can identify contextual information in or associated with the section of content, wherein the contextual information can include, for example, identification of the entity associated with the scene of content (e.g., "movie"), the name of the movie (e.g., "The Enforcer"), the scene of the movie associated with the section of content, type of movie (e.g., "action", "drama"), the gun in the section of content, the type of gun (e.g., "0.44 Magnum"), a person (e.g., "actor", "Clint Eastwood") in or associated with the section of content, the character (e.g., "Dirty Harry", "police detective") of the person in the section of content, the geographical location (e.g., "San Francisco") and landmark (e.g., "Alcatraz") in the scene in the section of content and/or the movie, the color type of the movie (e.g., "color movie"), the era or year (e.g., "1970s" and "1976", respectively) that the movie was made, and/or other contextual information associated with that section of content. The search management component 108 can generate a content identifier timestamp that can include the identified contextual information and time information (e.g., identifying the moment in time) associated with the section of content.

At some time after the contextual information has been identified and/or the content identifier timestamp has been generated, the user can enter a search query (e.g., "enforcer") using the communication device 102. The search management component 108 can analyze the search query. The search management component 108 can identify the search term "enforcer" in the search query. The search management component 108 also can analyze the contextual information associated with the section of content (e.g., analyze the information in the content identifier timestamp) to determine whether there is any contextual information that can be relevant to and/or can facilitate enhancing or better focusing the search query. If the search management component 108 determines that there is contextual information associated with the section of content that can be relevant to and/or can enhance the search query, the search management component 108 can augment the search query to include at least the portion of the contextual information associated with the section of content that can be relevant (e.g., most relevant, having a defined level of relevancy) and/or can facilitate enhancing (e.g., can have at least a defined level of query enhancement) to the search query, in accordance with the defined search criteria. In the example section of content involving the movie "The Enforcer", the search management component 108 can identify, for example, that the search query includes the search term "enforcer". Based on that analysis and identification, the search management component 108 can determine that certain contextual information (e.g., contained in the content identifier component) associated with the section of content can be relevant or at least potentially relevant to and/or can enhance the search query based at least in part on the section of content being from the movie "The Enforcer" and the search query containing the search term "enforcer". For instance, the search management component 108 can determine that certain contextual information (e.g., "Clint Eastwood", "Dirty Harry", "movie") associated with the section of content can be relevant or at least potentially relevant to and/or can enhance the search query. The search management component 108 can augment the search query (e.g., "enforcer") to generate an augmented search query (e.g., "enforcer 'Clint Eastwood' 'Dirty Harry' movie") that can focus the information search to facilitate obtaining customized search results that can be more focused on or relevant to the movie "The Enforcer".

As another example of focusing and/or disambiguating a search query, the communication device 102 can be presenting the TV show "House" starring Hugh Laurie to a user. The search management component 108 can analyze a section of content of the TV show "House" being presented by the communication device 102 at a given moment of time. The section of content can include, for instance, an actor (e.g., Hugh Laurie) as a character (e.g., Gregory House, doctor) in a scene of the TV show (e.g., "House") where the actor walks with a cane and gets on a motorcycle. Based on the analysis, the search management component 108 can identify contextual information in or associated with the section of content, wherein the contextual information can include, for example, identification of the entity associated with the scene of content (e.g., "TV show"), the name of the TV show (e.g., "House"), the section of content being associated with a TV show, the scene of the TV show associated with the section of content, type of TV show (e.g., "drama"), the motorcycle in the section of content, the make and model of the motorcycle, a person(s) (e.g., an actor(s), including "Hugh Laurie") in or associated with the section of content, a cane shown in the section of content, a color type of the TV show (e.g., "color TV show"), the era or year (e.g., "2009") that the TV show was made in or is set in, and/or other contextual information associated with that section of content. The search management component 108 can generate a content identifier timestamp that can include the identified contextual information and time information associated with the section of content.

At some time after the contextual information has been identified and/or the content identifier timestamp has been generated, the user can enter a search query (e.g., "house show") to the communication device 102. The search management component 108 can analyze the search query, and can identify the search terms "house" and "show" in the search query. The search management component 108 also can analyze the contextual information associated with the section of content to determine whether there is any contextual information that can be relevant to and/or can facilitate enhancing or better focusing the search query. Based on the analysis, the search management component 108 can determine that certain contextual information (e.g., "Hugh Laurie", "doctor", "drama", "TV show") associated with the section of content (e.g., contained in the content identifier timestamp) can be relevant or at least potentially relevant to and/or can facilitate enhancing (e.g., can have at least a defined level of query enhancement of) the information search (e.g., due to the user's search query including the terms "house" and "show" in relation to the section of content from the TV show "House" being presented by the communication device 102 to the user). For instance, based on that analysis and identification, and in accordance with the defined search criteria, the search management component 108 can determine that the term "house" in the search query can be disambiguated in the search query by including the phrase "Hugh Laurie" in proximity or relation to the term "house" (e.g., including the phrase "Hugh Laurie" before or after (e.g., directly before or after) the term "house" in the search query) to facilitate enhancing the search query to focus on search results relating to the TV show "House", as opposed to search results relating to houses (e.g., real estate, physical home structures). The search management component 108 also can determine that including the contextual information "TV show" (as opposed to the original query including the search term "show") and "drama" can further enhance the search query, in accordance with the defined search criteria. The search management component 108 can augment the search query (e.g., "house" "show") to include such contextual information associated with the section of content to generate an augmented search query (e.g., "house 'Hugh Laurie' 'TV show' drama").

To further illustrate this example, if instead the section of content being presented by the communication device 102 is part of the TV show "Flip That House" which relates to buying, renovating, and selling real estate (e.g., houses), and the search terms in the user's search query are again "house show", the search management component 108 can disambiguate the search query to focus the search query on real estate, as opposed to the TV show "House" starring Hugh Laurie, to facilitate enhancing the search query. For instance, the search management component 108 can analyze the section of content of the TV show "Flip That House" to identify contextual information associated with the entity. Based at least in part on the analysis, the search management component 108 can identify contextual information, such as, for example, the title of the entity (e.g., "Flip That House") associated with the section of content, a description of the entity (e.g., "a reality TV show that reveals the purchasing, renovating, and selling of homes and other real estate by the home flippers") associated with the section of content as provided by the TV listings, and/or other contextual information in or associated with the section of content. The search management component 108 can generate a content identifier timestamp that can include the identified contextual information and time information associated with the section of content.

When the search query "house show" is received by the communication device 102, the search management component 108 can analyze the contextual information associated with the section of content to determine whether there is any contextual information that can be relevant to and/or can facilitate enhancing the search query. The search management component 108 can identify certain contextual information (e.g., contained in the content identifier timestamp), such as, for example, the title of the entity (e.g., "Flip That House") associated with the section of content, portions of the description of the entity (e.g., "reality TV show", "real estate"), as being relevant or at least potentially relevant to the search query and/or can facilitate enhancing the search query. The search management component 108 can augment the search query (e.g., "house" "show") to include such contextual information associated with the section of content to generate an augmented search query (e.g., "'Flip That House' 'real estate' 'reality TV show'").

Once the search query has been refined (e.g., augmented), the search component 106 can transmit the search query (e.g., augmented search query) to the search engine 110. In response to receiving the search query, the search engine 110 can search information provider components (e.g., information or content servers), such as information provider component 112 and information provider component 114, and receive or retrieve information (e.g., information relating to web pages, content, etc.) from the information provider components, based at least in part on the search query, which can be augmented using the contextual information. The search engine 110 can generate a subset of search results (e.g., a subset of customized search results) that can be customized based at least in part on the contextual information, wherein the search results can comprise at least a portion of the information obtained from the information provider components (e.g., information provider component 112, information provider component 114). When executing the search using the search query, the search engine 110 can use the contextual information in the search query to facilitate identification of one or more relevant search results, disambiguation of the search query, or promotion of (e.g., increase in ranking of) a search result over another search result in the subset of search results, based at least in part on the contextual information (e.g., as contained in a content identifier timestamp), to facilitate the customization of the subset of search results. The search engine 110 can provide the subset of search results to the search component 106, which can provide (e.g., present) the subset of search results to the user via the communication device 102 or a second communication device.

In some implementations, the search component 106 can integrate online information access (e.g., Internet access) with the presentation of video content, audio content, or other content (e.g., textual content) on the communication device 102. The search component 106 can obtain (e.g., receive, detect, etc.), from the communication device 102, information relating to content being presented by the communication device 102 to a user. For example, the communication device 102 can be, can include, or can be associated with a set-top box and/or an integrated tuner that can provide information (e.g., title of the content, description of the content, etc.) relating to the content being presented by the communication device 102 to the user and/or the search component 106.

The search management component 108 can analyze the content being presented by the communication device 102, and based at least in part on the analysis, can recognize and/or identify information (e.g., objects, such as products, people, etc.; product brand or type of a product; name of an actor; program scene; dialogue; program or scene subject matter; description of the content, closed captioning information associated with the content; metadata associated with the content; etc.) in or associated with the presented content and the given moment in time (e.g., moment in time in relation to the overall presentation time of the entity (e.g., program, show, movie, song, video, electronic game, etc.) that includes the content, or current local time). For instance, based at least in part on the analysis of the content (e.g., at a given moment in time), the search management component 108 can recognize and/or identify objects, such as products, people, etc., within the section of content; product brand or type of a product of a product within the section of content; name of an actor appearing in or associated with the section of content; program scene that is part of the section of content; dialogue presented within that section of content; program or scene subject matter for that section of content; description of the content, closed captioning information associated with the section of content; metadata associated with the section of content; etc.

In some implementations, the search management component 108 can use a pattern recognition technique(s) to recognize and/or identify visual objects or visual information in or associated with the presented content, and/or can use a voice recognition technique(s) to recognize and/or identify audio objects or audio information in or associated with the presented content. By identifying the information in the content presented by the communication device 102 to the user and the moment in time associated with the identified information, the search management component 108 can correlate user activity during presentation of the content to the user with the particular moment in time the content is being presented to the user by the communication device 102. Based at least in part on the analysis of the content presented by the communication device 102, the search management component 108 can generate a content identifier timestamp that can include the information identified in the presented section of content, the moment in time associated with the identified information, and/or other information relating to the information identified in the presented section of content.

In accordance with various implementations, a search management component 108 can utilize other information (e.g., contextual information), such as information indicating the geographical location of the communication device 102, information (e.g., user interests, prior searches of user, etc.) in a user profile, etc., as additional or alternative context for a search query to facilitate customizing search results responsive to the search query. The search management component 108 also can track historical content viewing history and/or search history (e.g., search query history, search result viewing history, etc.) associated with a communication device 102 and/or a particular user of the communication device 102, and can store the historical content viewing history and/or the search history to build a user profile for the user and/or the associated communication device 102. The search management component 108 can use all or a portion of the historical content viewing history and/or search history associated with the user and/or associated communication device 102 as additional contextual information (e.g., in addition to the contextual information associated with a section of the television-related content currently being perceived by the user) that can be included in a search query being made by a user using the communication device 102 to facilitate customizing search results responsive to the search query.

To facilitate improving search relevance and/or search results responsive to a search query, the search management component 108 can utilize a filter component (e.g., including one or more filters of one or more types) to filter the viewing history of a user, for example, to only consider entities (e.g., programs, shows, movies, songs, videos, etc.) viewed or perceived (e.g., listened to) over a defined recent time period (e.g., within the last 24 hours, within the last week, with the last month, etc.) in identifying or generating the additional contextual information relating to the viewing history of the user and/or associated with the communication device 102. The search management component 108 also can utilize the filter component to filter the search history of the user, for example, to only consider search entities (e.g., search queries, search results, etc.) associated with the user and/or the associated communication device 102 over a defined recent time period in identifying or generating the additional contextual information relating to the search history of the user and/or associated with communication device 102.

The search management component 108 can use the additional contextual information (e.g., derived from user's historical content viewing history, user's search history, location of user's communication device 102, other information in the user profile, etc.), for example, to facilitate identifying or obtaining additional search results at least potentially relevant to the search query and/or can modify ranking of search results obtained in response to the search query, based at least in part on the additional contextual information, to customize the results to the search query. The search management component 108 can present the customized search results responsive to the search query via the communication device 102 associated with the user.

Figure 2:
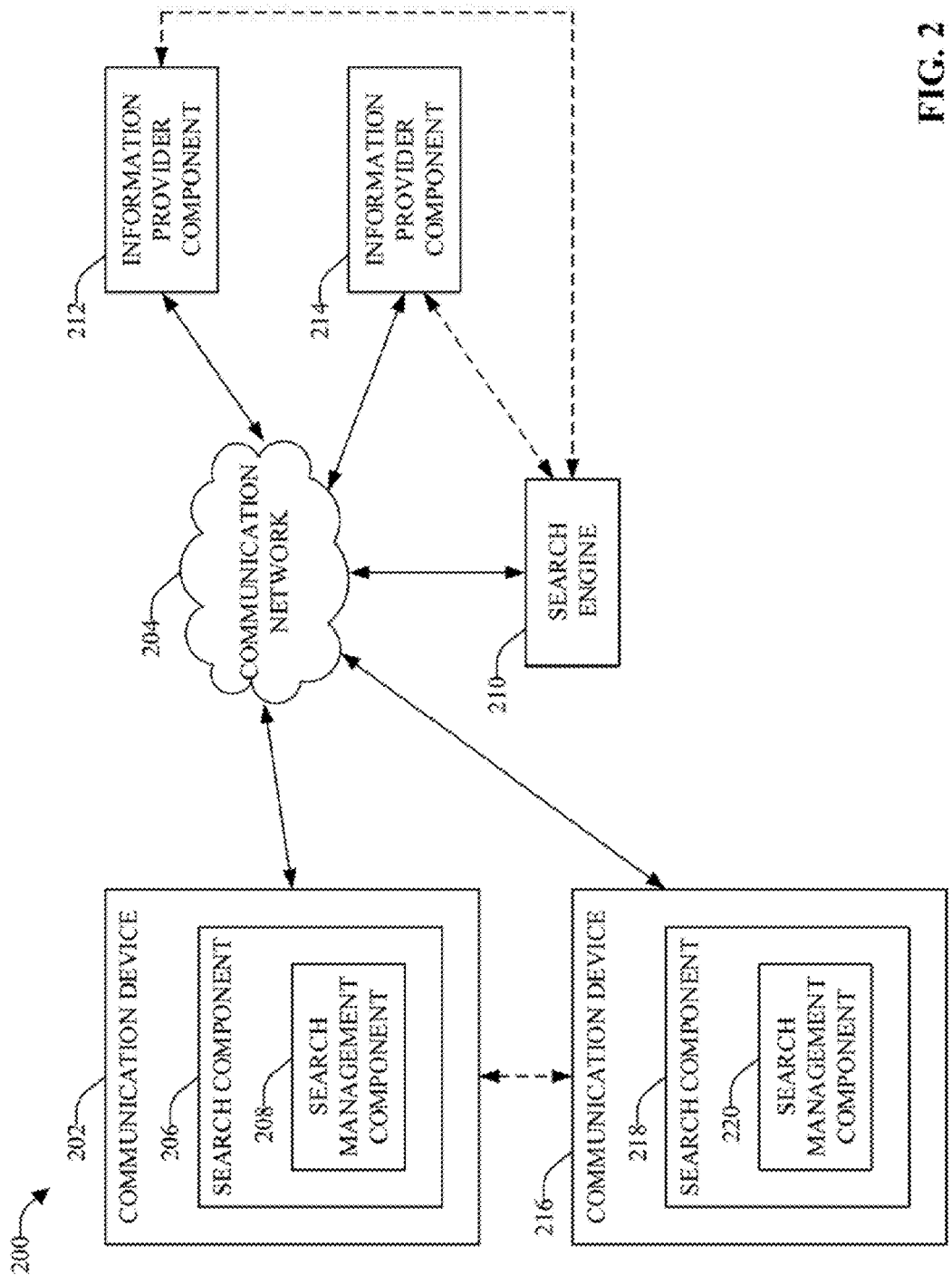
FIG. 2 depicts a diagram of an example system that can span or apply identified contextual information relating to content presented by a communication device to a search query by a second communication device to facilitate customizing search results in relation to the search query associated with the second communication device, in accordance with various aspects and implementations described herein.

Turning to FIG. 2, depicted is a block diagram of an example system 200 that can span or apply identified contextual information relating to content presented by a first communication device (e.g., television, IPTV, set-top box, etc.) to a search query by a second communication device (e.g., mobile phone, electronic pad or tablet, etc.) to facilitate customizing search results in relation to the search query associated with the second communication device, in accordance with various aspects and implementations described herein. The system 200 can include the communication device 202, communication network 204, search component 206, search management component 208, search engine 210, and a plurality of information provider components, including information provider component 212 and information provider component 214, which each can respectively be the same as or similar to, and/or can comprise the same or similar functionality as, respective components (e.g., respectively named components), as more fully disclosed herein.

The system 200 also can include a second communication device 216 that can receive or transmit information (e.g., video content, audio content, textual information or messages, etc.). The second communication device 216 can be or can comprise, for example, a mobile phone, an electronic tablet or pad, a computer, a content-streaming device, an electronic gaming device, a PDA, an electronic device (e.g., electronic eyewear or bodywear) comprising information communication functionality, etc.

The second communication device 216 can be associated with (e.g., communicatively connected to) the communication network 204, which can facilitate communication (e.g., receiving, transmitting) of information between the second communication device 216 and other communication devices (e.g., communication device 202, communication device associated with the search engine 210, information provider component 212, information provider component 214, etc.) associated with the communication network 204.

In some implementations, the communication device 202 can include the search component 206 and search management component 208. The second communication device 216 can include a search component 218, which can contain a search management component 220, wherein the search component 218 and search management component 220 can be the same as or similar to the search component 206 and search management component 208, respectively. In other implementations, a search component can be a stand-alone device and/or can be part of another device (e.g., communication device 202 is a television associated with another communication device, which is a set-top box, and the set-top box includes a search component).

There can be instances where, for example, a user can be perceiving (e.g., viewing, listening to) content being presented by the communication device 202 (e.g., a television, a television with a set-top box, an IPTV, etc.) while the user also has a second communication device 216 (e.g., mobile phone, electronic pad or tablet, electronic glasses, etc.) available for use. While perceiving the content being presented to the user by the communication device 202, the user may desire to use the second communication device 216 to do an information search (e.g., Internet search) that may be related to the content being presented to the user by the communication device 202.

In some implementations, a search component (e.g., 206, 218) can span the correlation between the contextual information associated with a section of content (e.g., as contained in the content identifier timestamp) and user activity of the user perceiving, or at least potentially perceiving, the content presented by the communication device 202 across more than one communication device (e.g., to the second communication device 216). For instance, the search management component 220 of the search component 218 can generate contextual information (e.g., as contained in or associated with a content identifier timestamp) in relation to content being presented by the communication device 202, and the contextual information can be included in a search query generated by the second communication device 216 that is paired with or in proximity to the communication device 202 to facilitate customizing search results based at least in part on that search query (e.g., as augmented using the contextual information).

In some implementations, the communication device 202 can be paired directly with the second communication device 216, for example, in accordance with a defined device pairing protocol and/or by having the communication device 202 and the second communication device 216 log in to a same account (e.g., same online access account), for example, using the same username and authentication credentials or using respective usernames and authentication credentials associated with the same account. At a given moment in time, the search management component 208 can identify contextual information relating to a section of content (e.g., of an entity, such as a program, movie, song, electronic game, etc.) being presented by the communication device 202 and can generate a content identifier timestamp that can include the contextual information. The search management component 208 of the communication device 202 can provide (e.g., transmit) the content identifier timestamp to the second communication device 216.

The search component 218 of the second communication device 216 can generate a search query, wherein the search management component 220 can augment or modify the search query to include the contextual information associated with the content identifier timestamp. The search component 218 can provide (e.g., transmit) the search query (e.g., augmented search query) to the search engine 210. The search engine 210 can process the search query and, in response to the search query, can generate a subset of search results that can be customized based at least in part on the contextual information in the search query. For instance, the search engine 210 can execute the search query to search or query one or more information provider components, such as information provider component 212 and/or information provider component 214, and can receive information from the plurality of information provider components based at least in part on the query terms, including contextual information, contained in the search query. The search engine 210 can generate and/or customize a subset of search results, based at least in part on the information obtained from the plurality of information provider components and the contextual information in the search query. The search engine 210 can provide the subset of search results to the second communication device 216 for presentation to the user of the second communication device 216.

In certain other implementations, the communication device 202 can be indirectly paired with the second communication device 216, for example, when the second communication device 216 is in proximity to (e.g., is within a defined distance of) the communication device 202. At a given moment in time, the search management component 220 of the second communication device 216 can identify contextual information relating to a section of content (e.g., of an entity, such as a program, movie, song, etc.) being presented by the communication device 202. The search management component 220 can generate a content identifier timestamp that can include the contextual information. For example, the second communication device 216 can perceive content being presented by the communication device 202, and the search management component 220 can analyze the content to identify contextual information in a section of that content at a given moment in time. The search component 218 can generate a search query that can be augmented or modified (e.g., by the search management component 220) to include the contextual information associated with the content identifier timestamp. The search component 218 can provide (e.g., transmit) the search query (e.g., augmented search query) to the search engine 210. The search engine 210 can process the search query, as disclosed herein, and, in response to the search query, can generate a subset of search results that can be customized based at least in part on the contextual information in the search query. The search engine 210 can provide the subset of search results to the second communication device 216 for presentation to the user of the second communication device 216.

It is to be appreciated and understood that, while the search component and the search management component have been depicted in the figures and described herein as being part of a communication device or as a stand-alone component (e.g., search component as a stand-alone component that comprises the search management component), the disclosed subject matter is not so limited. In accordance with various implementations, the search component and/or the search management component can be distributed among multiple components (e.g., distributed among the communication device and the search engine), the search component and/or the search management component can reside within the search engine or a server associated with the search engine, and/or the search component and/or the search management component respectively can comprise one or more sub-components that can be stand-alone sub-components.

In some implementations, respective sub-components of the search component and the search management component can be distributed among the communication device (e.g., 102, 202) and the search engine (e.g., 110, 210) or a server associated with the search engine. For instance, a first sub-component (e.g., a content identifier timestamp generator component) of the search management component can reside within or be associated with (e.g., be communicatively connected to) the communication device. The first sub-component can identify a section of content (e.g., television-related content) being presented by the communication device and/or a subset of contextual information (e.g., name of the program, show, or movie, etc.; name(s) of an actor(s); or other contextual information) associated with the section of the content. The first sub-component also can identify time information (e.g., moment or period in time) associated with the section of content. The first sub-component can associate (e.g., link) the information identifying the section of content (e.g., content identifier) and/or the subset of contextual information (if any) with the time information (e.g., time identifier). For example, the first sub-component can generate a content identifier timestamp that can include content-related information relating to the section of content, the subset of contextual information (if any), and the time information. In certain implementations or instances, the first sub-component may not identify contextual information associated with the section of content, wherein the content identifier timestamp can include content-related information, such as information identifying the section of content and the associated time information.

The search management component also can include one or more other sub-components (e.g., context component, pattern recognizer component, audio recognizer component, etc.) that can reside within or be associated with (e.g., be communicatively connected to) the search engine or the server associated with the search engine. The one or more other sub-components of the search management component can receive the content-related information (e.g., content identifier timestamp) relating to the section of content. In relation to a search query received from the communication device (e.g., a search query generated by a query sub-component of the portion of the search component associated with the communication device), the one or more other sub-components of the search management component can analyze the content-related information, and, based at least in part on the analysis, can identify, determine, or generate contextual information relating to the content-related information (as more fully disclosed herein), and can augment the search query based at least in part on (e.g., to include) at least portion of the contextual information (e.g., contextual information (if any) received with the content-related information (e.g., received with the content identifier timestamp) and/or the contextual information derived from the analysis of the content-related information by the one or more other sub-components) associated with the section of content to generate an augmented search query. Executing the augmented search query, the search engine can generate a subset of search results that can be customized based at least in part on the portion of the contextual information associated with the augmented search query, as more fully disclosed herein.

Figure 3:
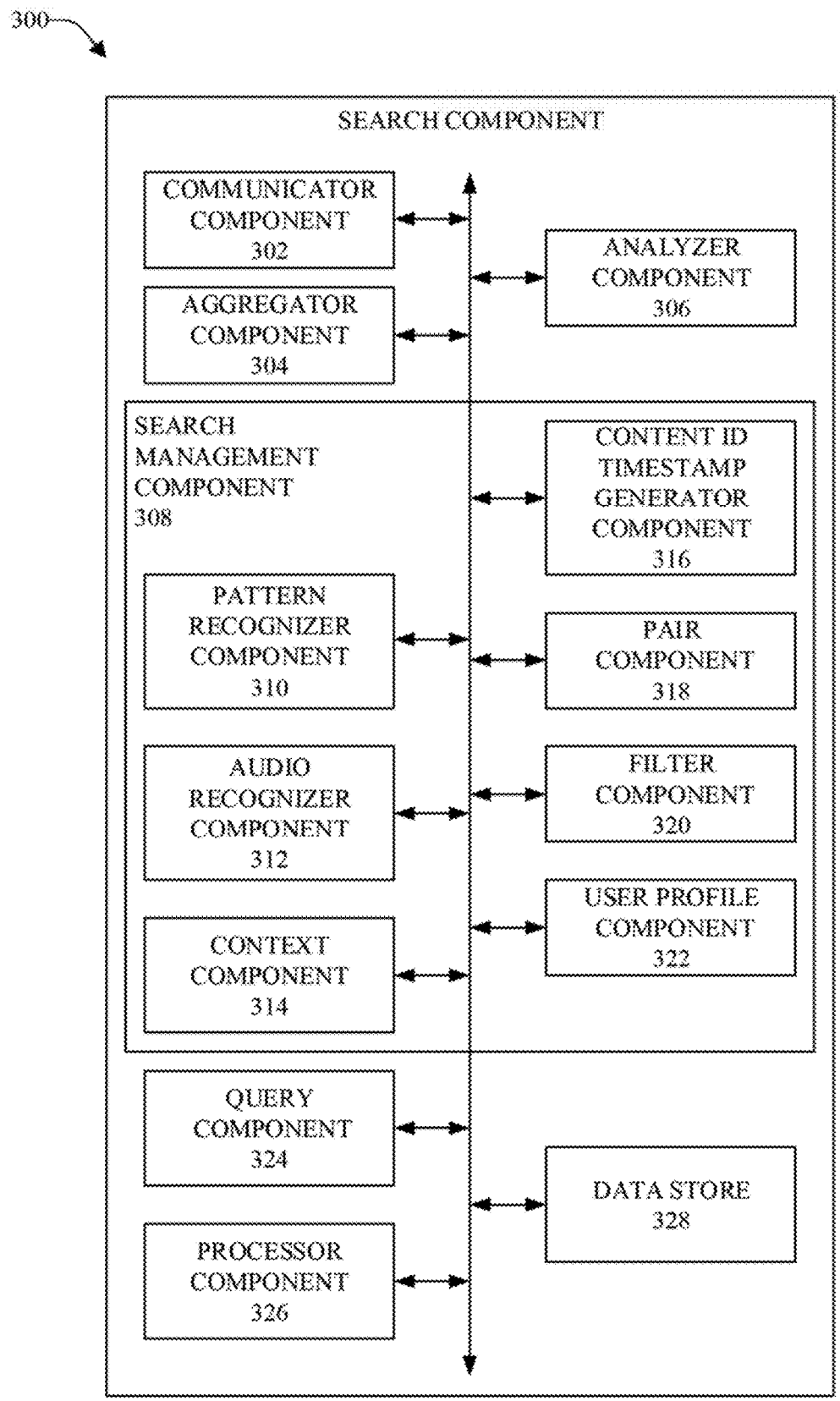
FIG. 3 illustrates a diagram of an example search component in accordance with various aspects and implementations disclosed herein.

FIG. 3 illustrates a block diagram of an example search component 300 in accordance with various aspects and implementations disclosed herein. The search component can be contained within or associated with (e.g., communicatively connected to), a communication device. The search component 300 can include a communicator component 302, an aggregator component 304, and an analyzer component 306.

The communicator component 302 can be used to communicate (e.g., transmit, receive) information between the search component 300 and other components (e.g., communication device(s), component in a communication network, search engine(s), user interface(s), processor component(s), data store(s), etc.). The information can include, for example, content being presented by a communication device, contextual information associated with a section of content, a search query, and/or other information. The search component 300 can use the information to facilitate generating a search query that can be augmented, based at least in part on contextual information associated with a section of content being presented by a communication device, to facilitate customizing search results based at least in part on the contextual information. The communicator component 302 can transmit a search query (e.g., augmented search query) to, for example, a search engine, which can execute the search query to facilitate obtaining search results that can be customized based at least in part on the contextual information contained in the search query. In some implementations, the communicator component 302 can establish a secured communication channel to communicate information, such as search queries or messages between the search component 300 and another component(s) (e.g., communication device, component within a communication network, search engine, etc.).

The aggregator component 304 can aggregate data received (e.g., obtained) from various entities (e.g., communication device(s), component in a communication network, search engine(s), user interface(s), processor component(s), data store(s), etc.). The aggregator component 304 can correlate respective items of data based at least in part on type of data, source of the data, time or date the data was generated or received, section of content associated with the data, etc., to facilitate analyzing of the data by the analyzer component 306.

The analyzer component 306 can analyze data to facilitate identifying contextual information associated with a section of content, generating a content identifier timestamp relating to the section of content, generating or augmenting a search query, etc., and can generate analysis results, based at least in part on the data analysis. For example, the analyzer component 306 (e.g., in conjunction with a search management component 308) can analyze information relating a section of content being presented by a communication device to facilitate identifying contextual information in or associated with the section of content, wherein the contextual information can be used by the search management component 308 to facilitate augmenting a search query, as more fully described herein. The analyzer component 306 can provide the analysis results to, for example, the search management component 308 or another component (e.g., processor component 326, data store 328) of the search component 300.

The search management component 308 can perform various functions, including, for example, identifying contextual information associated with a section of content, generating a content identifier timestamp relating to the section of content, generating or augmenting a search query, based at least in part on the analysis results. The search management component 308 also can control operations of the various components of the search component 300 and/or can provide instructions to the various components of the search component 300 to facilitate the performance of various tasks and functions by the various components of the search component 300. The search management component 308 can include, for example, a pattern recognizer component 310, an audio recognizer component 312, a context component 314, a content identifier timestamp generator component 316, a pair component 318, a filter component 320, and a user profile component 322.

The pattern recognizer component 310 can use one or more pattern recognition techniques, algorithms, and/or functions that can facilitate recognizing and/or identifying visual objects or visual information in or associated with the presented content (e.g., a section of content at a given moment in time) to facilitate identifying contextual information in or associated with the presented content. The audio recognizer component 312 can use one or more voice recognition techniques, algorithms, and/or functions that can facilitate recognizing and/or identifying audio objects or audio information in or associated with the presented content (e.g., a section of content at a given moment in time) to facilitate identifying contextual information in or associated with the presented content. By identifying contextual information in the content presented by the communication device to the user and the moment in time associated with the identified contextual information, the search management component 308 can facilitate correlating user activity during presentation of the content to the user with the particular moment in time the content is being presented to the user by the communication device.

The context component 314 can identify, recognize, and/or generate contextual information for a section of content presented by a communication device and associated with a given moment in time based at least in part on the visual objects (e.g., products, people, etc.) or visual information identified by the pattern recognizer component 310, the audio objects (e.g., sounds, words, songs, instruments, etc.) or audio information identified by the audio recognizer component 312, and/or other information (e.g., product brand or type of a product; name of an actor; program scene; dialogue; program or scene subject matter; description of the content, closed captioning information associated with the content; metadata associated with the content; etc.).

The content identifier timestamp generator component 316 can generate a content identifier timestamp relating to a section of content presented by a communication device, based at least in part on the identified contextual information. For instance, the content identifier timestamp generator component 316 can include all or a portion of the identified contextual information in the content identifier timestamp, time information (e.g., time the section of content was presented, time of the section of content in relation to the content as a whole, etc.) relevant to the contextual information, and/or other information. The content identifier timestamp generator component 316 can facilitate providing the content identifier timestamp to another component (e.g., the query component 324) or storing the content identifier timestamp in the data store 328.

The pair component 318 can be used to facilitate pairing (e.g., directly pairing) the communication device associated with the search component 300 with a second communication device. The pair component 318 can use a defined device pairing protocol to facilitate pairing the communication device with the second communication device. In some implementations, the pair component 318 can facilitate pairing the communication device with the second communication device when the pair component 318 identifies that the communication device and the second communication device are signed in to a same account (e.g., same online access account), for example, using the same username and authentication credentials or using respective usernames and authentication credentials associated with the same account. When the communication device and second communication device are paired by the pair component 318, contextual information (e.g., content identification timestamp that includes contextual information) associated with content presented by the communication device can be provided to the second communication device to facilitate augmenting search queries generated by the second communication device based at least in part on that contextual information, and/or contextual information (e.g., content identification timestamp that includes contextual information) associated with content presented by the second communication device can be received by the communication device (and search component 300) to facilitate augmenting search queries generated by the search component 300 of the communication device based at least in part on such contextual information.

The filter component 320 can include one or more filters, which can be one or more types of filters, that can be used on (e.g., applied to) the viewing history of a user, for example, to filter the viewing history to only consider entities (e.g., programs, shows, movies, songs, videos, etc.) viewed or perceived (e.g., listened to) over a defined recent time period (e.g., within the last 24 hours, within the last week, with the last month, etc.) in identifying or generating the additional contextual information (e.g., by the search management component 308) relating to the viewing history of the user and/or associated with the communication device. This can facilitate improving search relevance and/or search results responsive to a search query. The filter component 320 also can be used on (e.g., applied to) the search history of the user, for example, to filter the search history to only consider search entities (e.g., search queries, search results, etc.) associated with the user and/or the associated communication device over a defined recent time period in identifying or generating the additional contextual information relating to the search history of the user and/or associated with communication device. The filter component 320 can filter out items of information that are outside of the defined recent time period. The filter component 320 can thereby facilitate improving search relevance and/or search results responsive to a search query.

The user profile component 322 can facilitate maintaining (e.g., storing) respective user profiles for respective users. For a user, the user profile component 322 can create a user profile, and can store information relating to viewing history and/or search history of the user (e.g., in relation to the use of the communication device and/or another communication device). The user profiles generated by the user profile component 322 can be stored in the data store 328.

The search component 300 also can include a query component 324 that can generate search queries to facilitate obtaining search results responsive query. The query component 324 and search management component 308 can respectively operate to facilitate generating a search query that can be augmented based at least in part on contextual information associated with a section of content being presented by the communication (or a second communication device paired with the communication device) and/or other contextual information (e.g., contextual information derived from the user's historical content viewing history, contextual information derived from the user's search history, contextual information derived from the location of the user's communication device, other information in the user profile associated with the communication device, etc.). For instance, the search management component 308 can provide desired contextual information to the query component 324 and can control operation of the query component 324 to facilitate generating a search query that can be augmented to include desired contextual information.

In some implementations, the search component 300 also can include a processor component 326 that can operate with the other components (e.g., communicator component 302, aggregator component 304, analyzer component 306, etc.) to facilitate performing the various functions of the search component 300. The processor component 326 can employ one or more processors, microprocessors, or controllers that can process data, such as information relating to content presented by a communication device, information relating to other operations of the search component 300, and/or other information, etc., to facilitate identifying contextual information associated with a section of content, generating a content identifier timestamp (e.g., including the contextual information) relating to the section of content, generating or augmenting a search query (e.g., based at least in part on the contextual information), and/or performing other operations associated with the search component 300, as more fully disclosed herein. The processor component 326 can control or manage data flow between the search component 300 and other components (e.g., communication device(s), component in a communication network, search engine(s), user interface(s), processor component(s), data store(s), etc.) associated with the search component 300.

The search component 300 also can include a data store 328 that can store data structures (e.g., user data, video content, metadata), instructions, procedures, and/or code structure(s) (e.g., modules, objects, hashes, classes) to facilitate performing or controlling operations associated with the search component 300. The data store 328 also can store information (e.g., contextual information associated with content, content presented by the communication device, context identifier timestamps, pattern recognition algorithm(s), audio recognition algorithm(s), defined search criteria and/or corresponding search rules, etc.) that can facilitate generating search queries (e.g., augmented search queries), and/or information relating to other operations of the search component 300, etc., to facilitate identifying contextual information associated with a section of content, generating a content identifier timestamp (e.g., including the contextual information) relating to the section of content, generating or augmenting a search query (e.g., based at least in part on the contextual information), and/or performing or controlling operations, associated with the search component 300. The processor component 326 can be coupled (e.g., through a memory bus) to the data store 328 in order to store and retrieve information desired to operate and/or confer functionality, at least in part, to the components (e.g., communicator component 302, aggregator component 304, analyzer component 306, etc.) of the search component 300, and/or substantially any other operational aspects of the search component 300.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems, components, and devices described above, example methods that can be implemented in accordance with this disclosure can be further appreciated with reference to flowcharts in FIGS. 4-7. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

Figure 4:
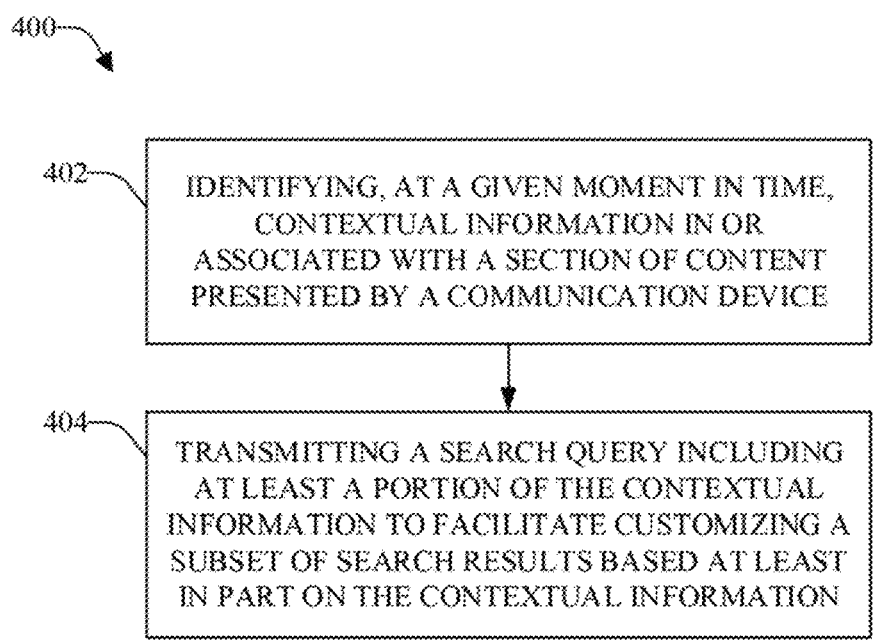
FIG. 4 depicts a flow chart of an example method that can use contextual information relating to content presented by a communication device as part of a search query (e.g., augmented search query) for an information search in accordance with various aspects and implementations described herein.

With reference to FIG. 4, illustrated is a flow chart of an example method 400 that can use contextual information relating to content presented by a communication device (e.g., television, IPTV, set-top box, electronic game, etc.) as part of a search query (e.g., augmented search query) for an information search in accordance with various aspects and implementations described herein. The method 400 can be used, for example, by a search component, which can include a search management component.

At 402, at a given moment in time, contextual information in or associated with a section of content (e.g., television-related content) presented by a communication device can be identified. The communication device can be, can include, or can be associated with, for example, one or more television-related devices (e.g., television, IPTV, set-top box, electronic gaming device, etc.). The search management component can monitor and analyze content being presented by the communication device. At a given moment in time, the search management component can identify contextual information in or associated with a section of content (e.g., television-related content) being presented by the communication device, based at least in part on the analysis of the section of content. For instance, the search management component can identify contextual information (e.g., object(s), such as a product, person, etc.; type or brand of product(s); name or description of an entity (e.g., TV show, movie, commercial, video, song, electronic game, etc.); actor(s); scene; dialogue; lyric(s); etc.) in or associated with the section of content at the given moment in time. The section of content can be, for example, a 1-frame snapshot of the content, a multi-frame snapshot of the content, a 1-second segment of content, a 5-second segment of content, a 10-second segment of content, or an amount of content of virtually any desired time length.

In some implementations, the search management component can generate a content identifier timestamp that can include the contextual information associated with the section of content and can identify the given moment in time associated with the section of content. The search management component can store the content identifier timestamp and/or contextual information in a data store, and can utilize the content identifier timestamp and/or contextual information to facilitate augmenting (e.g., enhancing, adding, etc.) a search query made by a user associated with the communication device (e.g., user perceiving the content being presented by the communication device and/or using the communication device to do information searches), based at least in part on the contextual information (e.g., by adding at least a portion of the contextual information to the search query).

At 404, a search query comprising at least a portion of the contextual information can be transmitted to facilitate customizing a subset of search results based at least in part on the contextual information. A user can enter a search query into the communication device (or a second communication device associated with (e.g., paired with) the communication device). The search component can generate a search query that can include the search terms provided by the user of the communication device (or second communication device). The search management component can identify at least a portion of contextual information associated with the section of content that can be relevant to and/or can enhance the search query, based at least in part on the search terms of the search query, as more fully disclosed herein. The search management component can augment the search query to include at least the identified portion of the contextual information. The search component can transmit the search query (e.g., augmented search query) to a search engine to facilitate obtaining a subset of search results that can be customized based at least in part on the contextual information included in the search query.

Figure 5:
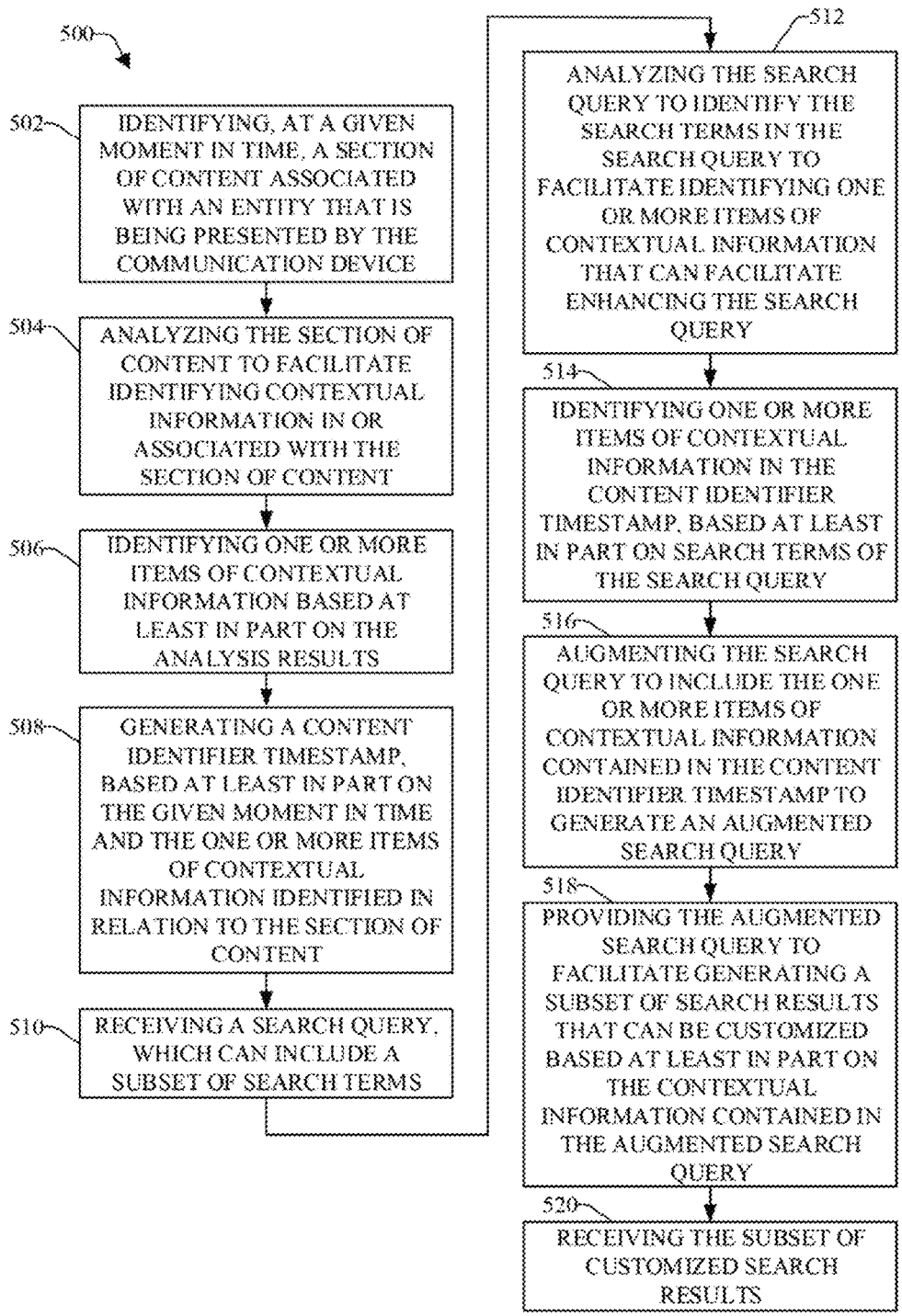
FIG. 5 depicts a flow chart of another example method that can use contextual information relating to content presented by a communication device as part of a search query (e.g., augmented search query) for an information search in accordance with various aspects and implementations described herein.

Referring to FIG. 5, depicted is a flow chart of another example method 500 that can use contextual information relating to content presented by a communication device (e.g., television, IPTV, set-top box, etc.) as part of a search query (e.g., augmented search query) for an information search in accordance with various aspects and implementations described herein. The method 500 can be used, for example, by a search component, which can include a search management component.

At 502, a section of content (e.g., television-related content) associated with an entity that is being presented by the communication device can be identified at a given moment in time. The search management component can monitor content being presented by the communication device. The content can be associated with an entity, such as, for example, a TV show, a movie, a commercial, a video, a song, an electronic game, etc. At a given moment in time, the search management component can identify a section of the content being presented by the communication device.

At 504, the section of content can be analyzed to facilitate identifying contextual information in or associated with the section of content. The search management component can analyze the section of content and/or associated information (e.g., metadata associated with the section of content) and generate analysis results, based at least in part on the analysis, to facilitate the identifying contextual information in or associated with the section of content.

At 506, one or more items of contextual information can be identified based at least in part on the analysis results. The search management component can employ various content analysis techniques, methods, or algorithms to facilitate identifying the one or more items of contextual information in or associated with the section of content. For example, the search management component can use a pattern recognition technique(s) or algorithm(s) to recognize and/or identify visual objects or visual information in or associated with the section of content, and/or can use a voice recognition technique(s) or algorithm(s) to recognize and/or identify audio objects or audio information in or associated with the section of content. The search management component also can use a text recognition technique(s) or algorithm(s) to recognize and/or identify alphanumeric characters or other textual characters, words, or other textual items in or associated with the section of content.

At 508, a content identifier timestamp can be generated, based at least in part on the given moment in time and the one or more items of contextual information identified in relation to the section of content. The search management component can generate the content identifier timestamp, which can include time information that can indicate the moment in time that the section of content occurred within the entity and/or other time information (e.g., the atomic time at which the section of content was presented by the communication device), and can include the one or more items of contextual information identified with regard to the section of content.

At 510, a search query, which can include a subset of search terms, can be received. The search component can receive the search query, for example, via the communication device, wherein the user can enter the search query using a user interface on the communication device.

At 512, the search query can be analyzed to identify the search terms in the search query to facilitate identifying one or more items of contextual information that can facilitate enhancing the search query. The search management component can analyze the search query to identify the search terms of the search query.

At 514, one or more items of contextual information can be identified in the content identifier timestamp, based at least in part on search terms of the search query. The search management component can identify one or more items of contextual information in the content identifier timestamp that can facilitate enhancing the search query, as more fully disclosed herein.

At 516, the search query can be augmented to include the one or more items of contextual information contained in the content identifier timestamp to generate an augmented search query. The search management component can augment the search query to include the one or more items of contextual information contained in the content identifier timestamp to generate the augmented search query, which can facilitate enhancing the information search.

At 518, the augmented search query can be provided (e.g., transmitted to a search engine) to facilitate generating a subset of search results (e.g., a subset of customized search results) that can be customized based at least in part on the contextual information contained in the augmented search query. The search component can transmit the augmented search query to the search engine. The search engine can generate a subset of search results that can be customized based at least in part on the contextual information contained in the augmented search query.

At 520, the subset of customized search results be received. The search component can receive the subset of customized search results from the search engine. The search component can facilitate presenting (e.g, displaying, emitting, etc.) the subset of customized search results on a user interface of the communication device to facilitate viewing or perceiving of the subset of customized search results by the user.

Figure 6:
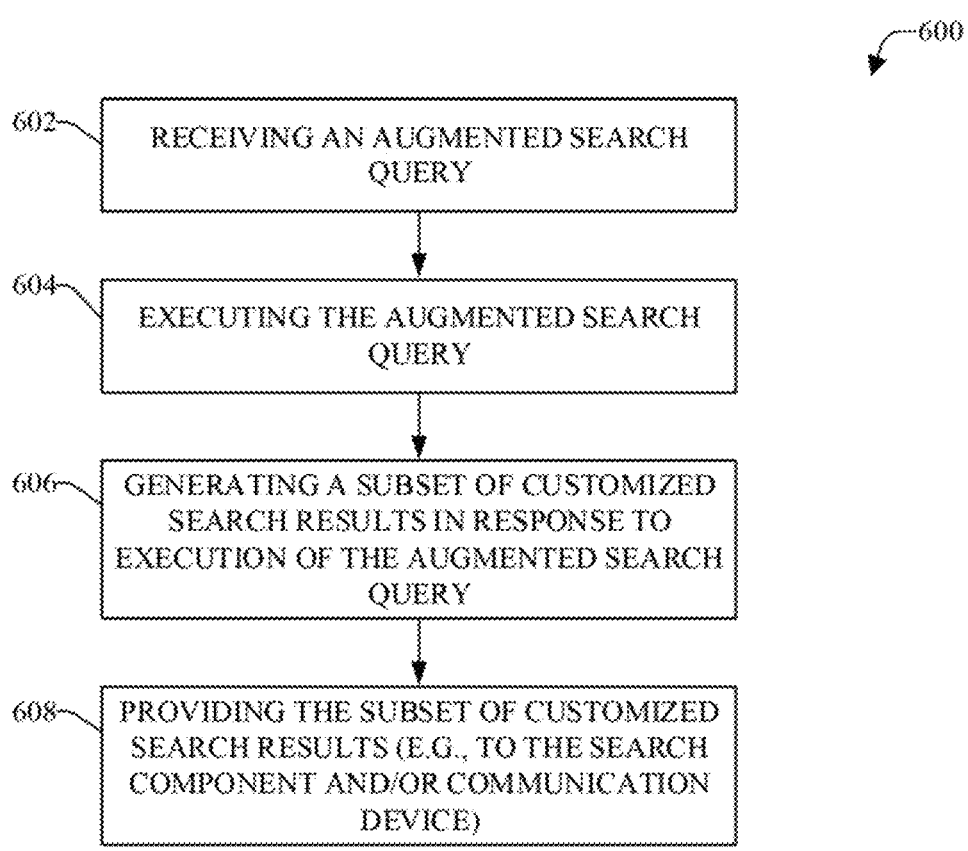
FIG. 6 illustrates a flow chart of an example method that can facilitate generating a subset of customized search results based at least in part on an augmented search query that includes contextual information relating to content presented by a communication device, in accordance with various aspects and implementations described herein.

FIG. 6 illustrates a flow chart of an example method 600 that can facilitate generating a subset of customized search results based at least in part on an augmented search query that includes contextual information relating to content presented by a communication device (e.g., television, IPTV, set-top box, etc.), in accordance with various aspects and implementations described herein. The method 600 can be used, for example, by a search engine, which can be associated with (e.g., part of, communicatively connected to, etc.) one or more information provider components.

At 602, an augmented search query can be received. The search engine can receive the augmented search query from a search component associated with the communication device or a second communication device associated with (e.g., directly or indirectly paired with) the communication device. The search management component of the search component can augment a search query, which can include one or more search terms (e.g., as received from a user of the communication device or second communication device), based at least in part on the contextual information and the one or more search terms, to generate the augmented search query.

At 604, the augmented search query can be executed. The search engine can execute the search query to facilitate searching one or more information provider components (e.g., information or content servers) associated with the search engine, based at least in part on the information (e.g., search terms, contextual information (e.g., search term(s) based at least in part on the contextual information), etc.) contained in the augmented search query.

At 606, a subset of customized search results can be generated in response to execution of the augmented search query. In response to the execution of the augmented search query, the search engine can obtain (e.g., receive, retrieve, etc.) search results. Based at least in part on the contextual information in the augmented search query, the search results can be customized (e.g., by the search engine) to include search results that would not otherwise have been obtained if the original search query without the contextual information had been used for the search and/or to modify the ordering, ranking, emphasis, etc., of respective search results in relation to each other as compared to the ordering, ranking, emphasis, etc., the respective search results would have had in relation to each other if the original search query without the contextual information had been used.

At 608, the subset of customized search results can be provided (e.g., transmitted), for example, to the search component and/or the communication device or the second communication device. For instance, the search engine can provide the subset of customized search results to the search component associated with the communication device or the second communication device. The communication device or second communication device that received the subset of customized search results can present (e.g, display, emit, etc.) the subset of customized search results on a user interface of the communication device or second communication device to facilitate viewing or perceiving of the subset of customized search results by the user.

Figure 7:
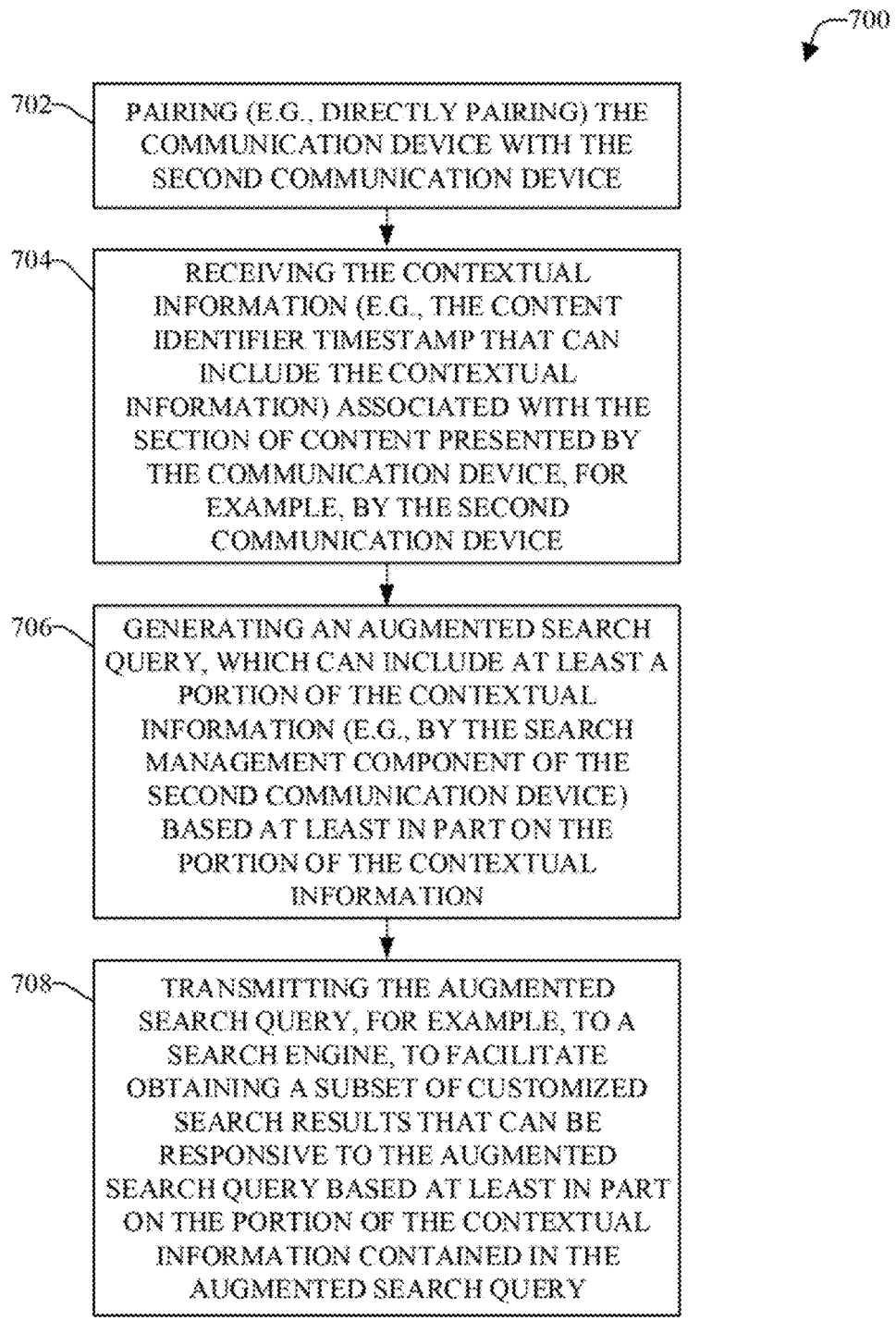
FIG. 7 presents a flow chart of an example method that can facilitate pairing (e.g., directly pairing) a communication device and a second communication device to facilitate customizing search results responsive to a search query (e.g., augmented search query) by the second communication device based at least in part on contextual information relating to content presented by the communication device, in accordance with various aspects and implementations described herein.

FIG. 7 presents a flow chart of an example method 700 that can facilitate pairing (e.g., directly pairing) a communication device and a second communication device to facilitate customizing search results responsive to a search query (e.g., augmented search query) by the second communication device (e.g., mobile phone, computer, electronic pad or tablet, electronic eyewear, etc.) based at least in part on contextual information relating to content presented by the communication device (e.g., television, IPTV, set-top box, etc.), in accordance with various aspects and implementations described herein. The method 700 can be used, for example, by a search component, which can include a search management component, wherein search components can be respectively associated with (e.g., part of, communicatively connected to, etc.) the communication device and the second communication device.

At 702, the communication device can be paired (e.g., directly paired) with the second communication device. The search management component of the second communication device can facilitate pairing (e.g., linking, associating, etc.) the second communication device with the communication device. For instance, the search management component can facilitate logging in (e.g., signing in) the second communication device to the same account (e.g., online access account), e.g., using the same username and authentication credentials or using respective usernames and authentication credentials associated with the same account, in accordance with the defined device pairing protocol. The logging in of the second communication device to the same account as the communication device can pair, or at least facilitate pairing, the second communication device and the communication device.

The search management component of the communication device can generate contextual information relating to a section of content (e.g., of an entity, such as a program, movie, song, etc.) being presented by the communication device at a given moment in time. In some implementations, the search management component of the communication device can generate a content identifier timestamp that can include the contextual information and/or identify the given moment in time. The search management component of the communication device can provide (e.g., transmit) the contextual information or content identifier timestamp associated with the section of content to the second communication device.

At 704, the contextual information (e.g., the content identifier timestamp that can include the contextual information) associated with the section of content presented by the communication device can be received, for example, by the second communication device.

At 706, an augmented search query, which can include at least a portion of the contextual information, can be generated, for example, by the search management component of the second communication device, based at least in part on the portion of the contextual information.

At 708, the augmented search query can be transmitted, for example, to a search engine, to facilitate obtaining a subset of customized search results that can be responsive to the augmented search query based at least in part on the portion of the contextual information contained in the augmented search query. The search engine can receive the augmented search query and can execute the search query to facilitate searching or querying one or more information provider components. The search engine can receive information from the plurality of information provider components based at least in part on the query terms, including contextual information, contained in the augmented search query. The search engine can generate the subset of customized search results, based at least in part on the information obtained from the plurality of information provider components and the contextual information in the augmented search query. The search engine can provide the subset of customized search results to the second communication device for presentation to the user of the second communication device.

Figure 8:
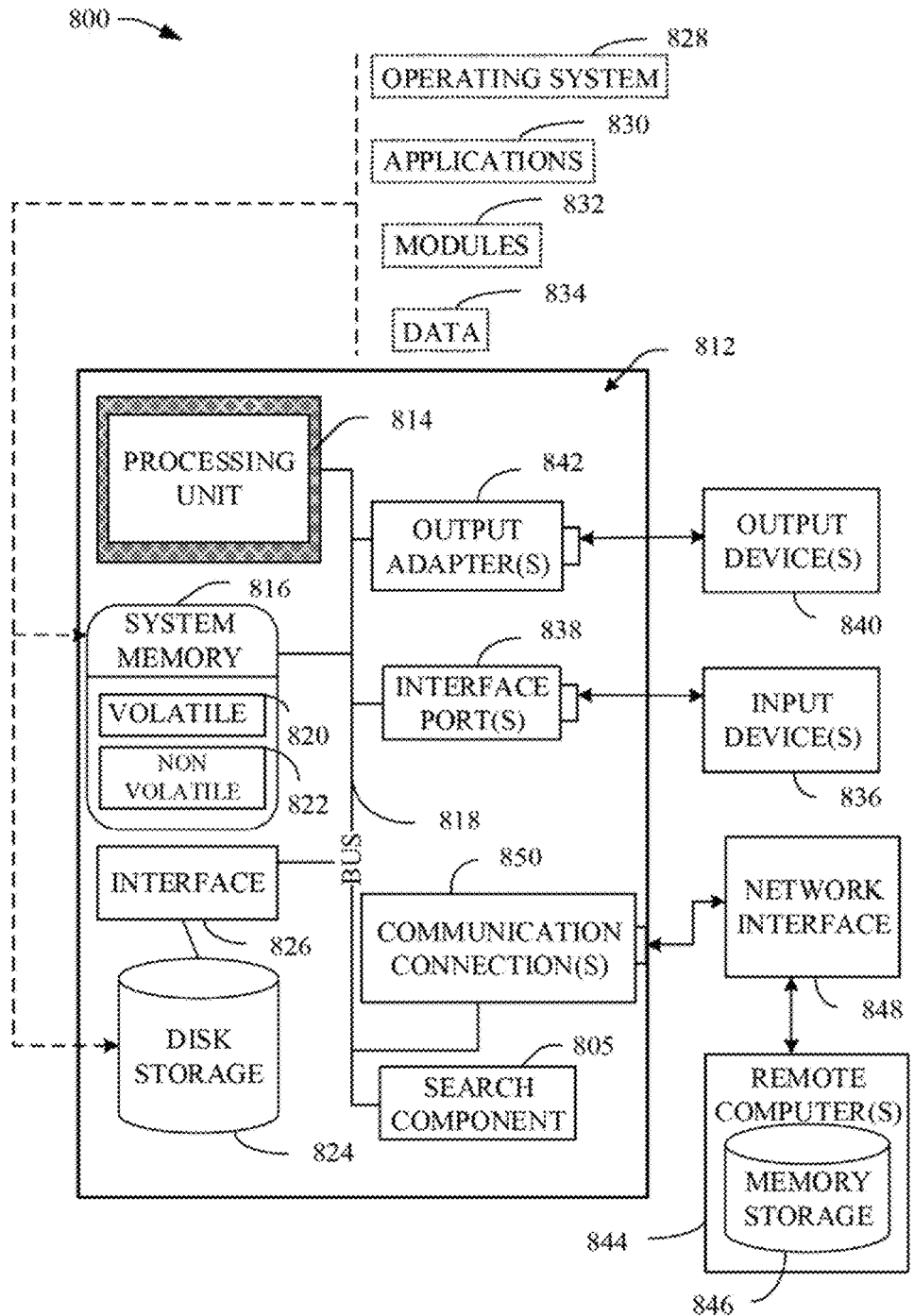
FIG. 8 is a schematic block diagram illustrating a suitable operating environment.
Figure 9:
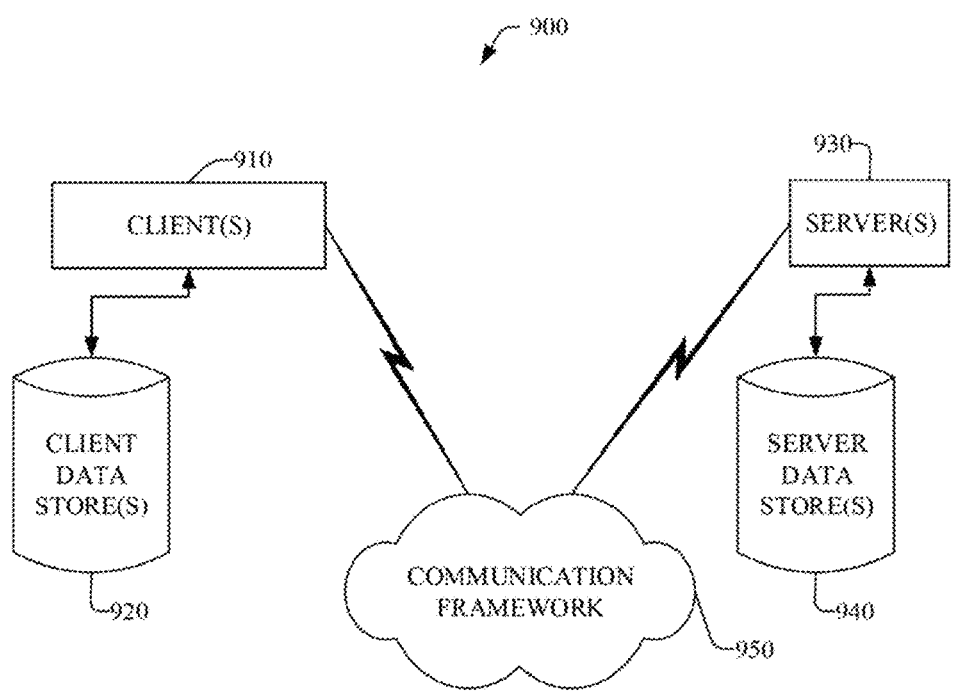
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. With reference to FIG. 8, a suitable operating environment 800 for implementing various aspects of this disclosure includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 also includes removable/non-removable, volatile/nonvolatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

FIG. 8 also depicts software that acts as an intermediary between users and the basic computer resources described in the suitable operating environment 800. Such software includes, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

In accordance with various aspects and implementations, the computer 812 can be used to present content (e.g., video content, audio content, textual content, etc.), perform information searches (e.g., execute search queries or present search queries for execution), augment information searches (e.g., augment search queries), and/or present search results (e.g., customized search results), etc., as more fully disclosed herein. In some implementations, the computer 812 can include a plurality of processors that can be used to process data and perform computing tasks (e.g., encoding-related tasks and/or decoding-related tasks, etc.), as more fully disclosed herein. In certain exemplary embodiments, the computer 812 can include a search component 805 (as depicted) that can contain, for example, a search management component, that can function as more fully disclosed herein to facilitate identifying contextual information associated with a section of content, generating a content identifier timestamp (e.g., including the contextual information) relating to the section of content, generating or augmenting a search query (e.g., based at least in part on the contextual information), and/or performing other operations associated with the search component 805, as disclosed herein. In various other implementations, the computer 812 can be utilized by a search engine (not shown in FIG. 8) to facilitate executing a search query, searching information databases (e.g., associated with information provider components), and/or generating or customizing search results, etc., and/or can be utilized by an information provider component (not shown in FIG. 8) to facilitate storing information (e.g., video content, audio content, textual content, etc.) and providing information that can be responsive to a search query, for example.

FIG. 9 is a schematic block diagram of a sample-computing environment 900 with which the subject matter of this disclosure can interact. The sample-computing environment 900 includes one or more client(s) 910. The client(s) 910 can be hardware and/or software (e.g., threads, processes, computing devices). The sample-computing environment 900 also includes one or more server(s) 930. Thus, sample-computing environment 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing this disclosure, for example. One possible communication between a client 910 and a server 930 may be in the form of a data packet transmitted between two or more computer processes.

The sample-computing environment 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

It is to be appreciated and understood that components (e.g., communication device, communication network, search component, search management component, search engine, information provider component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSDPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablet, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "engine," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   at least one memory that stores computer executable components; and
   at least one hardware processor that executes computer executable components stored in the at least one memory, wherein the hardware processor:
   causes media content to be presented;
   receives viewing activity information corresponding to the media content accessed using a user account;
   identifies, at a first time point, contextual information associated with the media content being presented based on the viewing activity information, wherein the contextual information comprises one or more terms that at least indicate an identifier of the media content and a timestamp that indicates the first time point;
   receives, from a user of a communication device at a second time point, a search query containing a plurality of search terms, wherein the second time point is after the first time point;
   determines whether the one or more terms of the contextual information relate to at least one of the plurality of search terms based on the timestamp included in the contextual information that indicates the first time point at which the contextual information was identified and the second time point;
   in response to determining that the one or more terms of the contextual information relate to at least one of the plurality of search terms, modifies the search query by appending the one or more terms of the contextual information that indicate the identifier of the media content to the search query received from the user of the communication device;
   transmits the modified search query to a search engine to obtain search results responsive to the modified search query; and
   causes the search results retrieved using the modified search query with the appended one or more terms of the contextual information to be presented.

2. The system of claim 1, wherein the media content is caused to be presented on a first communication device and wherein the search results are caused to be presented on a second communication device.

3. The system of claim 1, wherein a first communication device that presents the media content is associated with a communication network, wherein the hardware processor determines that a second communication device is associated with the communication network, and wherein the search results are caused to be presented on the second communication device in response to determining that the second communication device is associated with the communication network.

4. The system of claim 1, wherein the media content is caused to be presented on a first communication device, wherein the hardware processor determines that a second communication device is within a defined proximity to the first communication device, and wherein the search results are caused to be presented on the second communication device in response to determining that the second communication device is within the defined proximity to the first communication device.

5. The system of claim 1, wherein the hardware processor generates a content identifier timestamp associated with the media content and wherein the content identifier timestamp is associated with the contextual information and facilitates establishing a correlation between the content identifier timestamp and user activity of a user.

6. The system of claim 1, wherein the media content is caused to be presented on a first communication device and wherein the hardware processor communicates the contextual information to a second communication device for generating the modified search query.

7. The system of claim 1, wherein the hardware processor:
   stores the viewing activity information corresponding to the media content.

8. A method, comprising:
   causing, using a hardware processor, media content to be presented;
   receiving viewing activity information corresponding to the media content accessed using a user account;
   identifying, at a first time point, contextual information associated with the media content being presented based on the viewing activity information, wherein the contextual information comprises one or more terms that at least indicate an identifier of the media content and a timestamp that indicates the first time point;
   receiving, from a user of a communication device at a second time point, a search query containing a plurality of search terms, wherein the second time point is after the first time point;

determining whether the one or more terms of the contextual information relate to at least one of the plurality of search terms based on the timestamp included in the contextual information that indicates the first time point at which the contextual information was identified and the second time point;

in response to determining that the one or more terms of the contextual information relate to at least one of the plurality of search terms, modifying the search query by appending the one or more terms of the contextual information that indicate the identifier of the media content to the search query received from the user of the communication device; and transmitting the modified search query to a search engine to obtain search results responsive to the modified search query; and causing the search results retrieved using the modified search query with the appended one or more terms of the contextual information to be presented.

9. The method of claim 8, wherein the media content is caused to be presented on a first communication device and wherein the search results are caused to be presented on a second communication device.

10. The method of claim 8, wherein a first communication device that presents the media content is associated with a communication network, wherein the method further comprises determining that a second communication device is associated with the communication network, and wherein the search results are caused to be presented on the second communication device in response to determining that the second communication device is associated with the communication network.

11. The method of claim 8, wherein the media content is caused to be presented on a first communication device, wherein the method further comprises determining that a second communication device is within a defined proximity to the first communication device, and wherein the search results are caused to be presented on the second communication device in response to determining that the second communication device is within the defined proximity to the first communication device.

12. The method of claim 8, further comprising determining a content identifier timestamp associated with the media content, wherein the content identifier timestamp is associated with the contextual information and facilitates establishing a correlation between the content identifier timestamp and user activity of a user.

13. The method of claim 8, wherein the media content is caused to be presented on a first communication device and wherein the method further comprises communicating the contextual information to a second communication device for generating the modified search query.

14. The method of claim 8, further comprising:
storing the viewing activity information corresponding to the media content.

15. A system, comprising:
at least one memory that stores computer executable components; and
at least one processor that executes the following computer executable components stored in the at least one memory:
a server component that stores a set of items of information; and
a search engine that searches the set of items of information in the server component to generate a subset of search results retrieved using a search query received at a first time point that has been modified by having one or more terms of contextual information identified at a second time point that indicate an identifier of media content and a timestamp that indicates the second time point appended to the search query in response to a determination that one or more terms of the contextual information relate to at least one term of a plurality of search terms contained in the search query based on the time stamp indicated by the contextual information that indicates the second time point at which the contextual information was identified and the first time point, wherein the search query was received from a user of a communication device, wherein the first time point is after the second time point, and wherein the contextual information is identified based on received viewing activity information that corresponds to the media content accessed using a user account.

16. The system of claim 15, wherein the search engine receives the search query from a communication device that identified the contextual information in relation to the media content presented by the communication device.

17. The system of claim 15, wherein the search engine transmits the subset of search results to a communication device that is presenting the media content.

18. The system of claim 15, wherein the search engine transmits the subset of search results to a communication device that provided the search query.

* * * * *